US011146918B2

(12) United States Patent
Rao et al.

(10) Patent No.: US 11,146,918 B2
(45) Date of Patent: Oct. 12, 2021

(54) SYSTEMS AND METHODS FOR NETWORK NODE COMMUNICATION USING DYNAMICALLY CONFIGURABLE INTERACTION MODES

(71) Applicant: Ford Global Technologies, LLC, Dearborn, MI (US)

(72) Inventors: Jayanthi Rao, West Bloomfield, MI (US); Jovan Zagajac, Ann Arbor, MI (US); John Walpuck, West Bloomfield, MI (US); Samer Ibrahim, Dearborn, MI (US); Syed Amaar Ahmad, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/436,857

(22) Filed: Jun. 10, 2019

(65) Prior Publication Data
US 2020/0389761 A1 Dec. 10, 2020

(51) Int. Cl.
G08G 1/14 (2006.01)
H04W 4/029 (2018.01)
(Continued)

(52) U.S. Cl.
CPC ........ H04W 4/029 (2018.02); B62D 15/0285 (2013.01); G08G 1/143 (2013.01);
(Continued)

(58) Field of Classification Search
CPC ......... H04W 4/029; H04W 4/80; H04W 4/40; G08G 1/143; G08G 1/14–1/49; B62D 15/0285
See application file for complete search history.

(56) References Cited

U.S. PATENT DOCUMENTS 9,172,784 B2 * 10/2015 Grost ................ H04M 1/72577
10,049,408 B2 8/2018 Carver et al.
(Continued)

FOREIGN PATENT DOCUMENTS

WO 2014/073174 A1 5/2014

OTHER PUBLICATIONS

U.S. Department of Transportation Federal Highway Administration (2017). A Systemic Approach to Safety—Using Risk to Drive Action (1 page). Retrieved from https://safety.fhwa.dot.gov/systemic/.
(Continued)

Primary Examiner — Jinsong Hu
Assistant Examiner — Farideh Madani
(74) Attorney, Agent, or Firm — Brandon Hicks; Eversheds Sutherland (US) LLP

(57) ABSTRACT

Systems, methods, and computer-readable media are disclosed for network node communication using dynamically configurable interaction modes. Example methods may include identify a first triggering event associated with an agent, the agent comprising a vehicle or a user; determine a first mode for the agent based on the first triggering event; exchange a first communication with other agents over a network, wherein the first communication is based on the first mode and comprises a first action to be taken by the other agents; determine a second mode for the agent based on a second triggering event; and exchange a second communication with the other agents over the network, wherein the second communication is based on the second mode and comprises a second action to be taken by the other agents, and wherein the second mode and the first mode are of different types.

15 Claims, 9 Drawing Sheets

(51) Int. Cl.
  *H04W 4/12* (2009.01)
  *H04W 4/80* (2018.01)
  *B62D 15/02* (2006.01)
  *H04W 4/40* (2018.01)

(52) U.S. Cl.
  CPC .............. *H04W 4/12* (2013.01); *H04W 4/40* (2018.02); *H04W 4/80* (2018.02)

(56) References Cited

U.S. PATENT DOCUMENTS

| | | | |
|---|---|---|---|
| 10,222,228 B1 | 3/2019 | Chan et al. | |
| 2001/0041831 A1* | 11/2001 | Starkweather | A61N 1/37211 600/365 |
| 2007/0087733 A1* | 4/2007 | Gerlach | H04M 3/51 455/418 |
| 2015/0163846 A1* | 6/2015 | Weizman | H04W 76/23 455/41.2 |
| 2015/0274156 A1* | 10/2015 | Phillips | B60W 20/12 701/22 |
| 2017/0243485 A1* | 8/2017 | Rubin | H04W 4/026 |
| 2017/0287331 A1* | 10/2017 | Laur | H04W 84/005 |
| 2018/0058967 A1* | 3/2018 | Jang | G01C 5/06 |
| 2018/0165173 A1* | 6/2018 | Lin | G06F 11/3476 |
| 2019/0049982 A1 | 2/2019 | Yang et al. | |
| 2019/0101914 A1 | 4/2019 | Coleman, II et al. | |
| 2019/0364402 A1* | 11/2019 | Lee | H04W 4/90 |
| 2020/0043342 A1* | 2/2020 | Cunningham | B60W 30/0953 |

OTHER PUBLICATIONS

U.S. Department of Transportation Federal Highway Administration (2017). Potential Risk Factors (1 page). Retrieved from https://safety.fhwa.dot.gov/systemic/pdf/FHWA_SystemicApproach_PotentialRiskFactors.pdf.

* cited by examiner

| Actor 302 | Mode 304 | Trigger 306 | Message to Send 308 | Message Frequency 310 | Incomming Messages to Filter 312 | Action at the Receiver 314 |
|---|---|---|---|---|---|---|
| $V_B$ 335 | Parking-in-Progress 336 | Active Parking System is Engaged 337 | Parking-in-Progress Message (Location, Heading, Spot ID) 338 | 3Hz 339 | None 340 | Give Vehicle Space as it Parallel Parks 341 |
| $V_B$ 342 | Just-Parked 343 | $V_B$ Notices That it is in Designated Parking Zone on Digital Map, Confirms with Sensor that Sees the Curb is <12in Away 344 | Just-Parked Message (Location, Direction, Spot ID) 345 | 3Hz 346 | None 347 | Indicate to Near by Vehicles Looking for Parking that S is No Longer Open 348 |

| Actor 302 | Mode 304 | Trigger 306 | Message to Send 308 | Message Frequency 310 | Incomming Messages to Filter 312 | Action at the Receiver 314 |
|---|---|---|---|---|---|---|
| $D_B$ 350 | Exiting-Vehicle-Roadside 351 | $V_B$ is Turned Off in Designated Parking Zone, Weight is Shifting Around in Driver's Seat as $D_B$ Prepares to Exit 352 | High-Alert-Pedestrain-Safety Message (Position, Heading, High-Alert Flag) 353 | 20Hz 354 | Basic-Safety-Message 355 | Alert Drivers that a Pedestrain is in an Extremely Vulnerable Position; Slow Down/Stop 356 |

SYSTEMS AND METHODS FOR NETWORK NODE COMMUNICATION USING DYNAMICALLY CONFIGURABLE INTERACTION MODES

TECHNICAL FIELD

The present disclosure relates to systems and methods for network node communication, and more specifically, to methods and systems for network node communication using dynamically configurable interaction modes.

BACKGROUND

Traffic accidents and roadway congestion represents significant challenges in present transportation systems. By sharing data to surrounding vehicles and infrastructural components, vehicle communications systems may serve to enhance traffic efficiency by providing warnings for upcoming traffic congestions, proposing alternative routes and ensuring eco-friendly driving, and reducing emissions.

There may be delays between collecting data and presenting it to a particular vehicle driver where the information may be outdated or misleading. Further, current vehicle communications systems may not share granular data regarding the vehicles in a manner that facilitates interactions between vehicles in many transportation scenarios.

Therefore, systems and methods are needed to provide enhanced interactions between vehicles to improve transportation systems.

BRIEF DESCRIPTION OF THE DRAWINGS

FIG. 3B illustrates additional tables that continue the example of FIG. 3A, in accordance with example embodiments of the disclosure.

DETAILED DESCRIPTION

Overview

Figure 1:
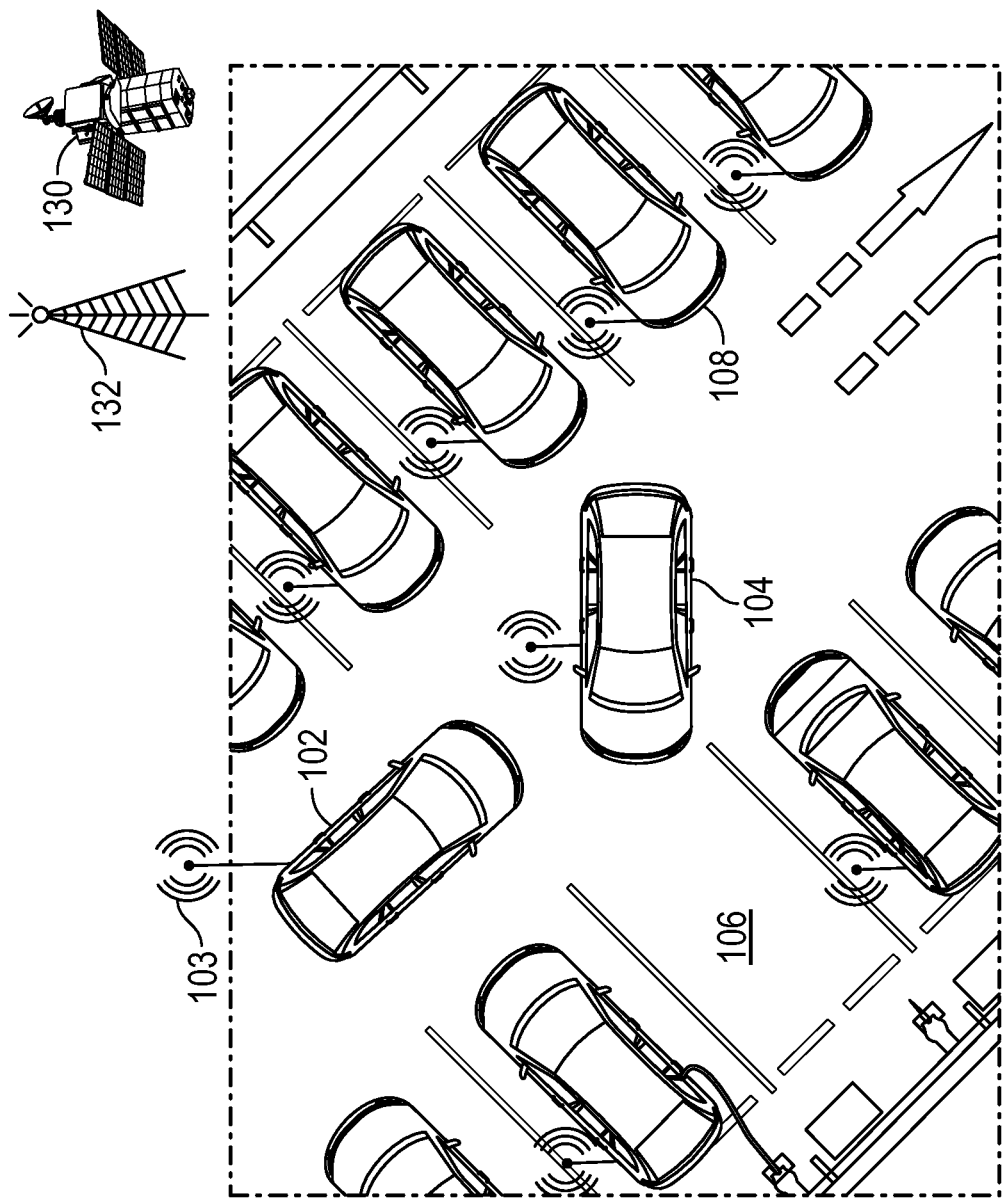
FIG. 1 shows a diagram of an example environmental context for vehicle communication using dynamically configurable interaction modes, in accordance with example embodiments of the disclosure.
Figure 1:
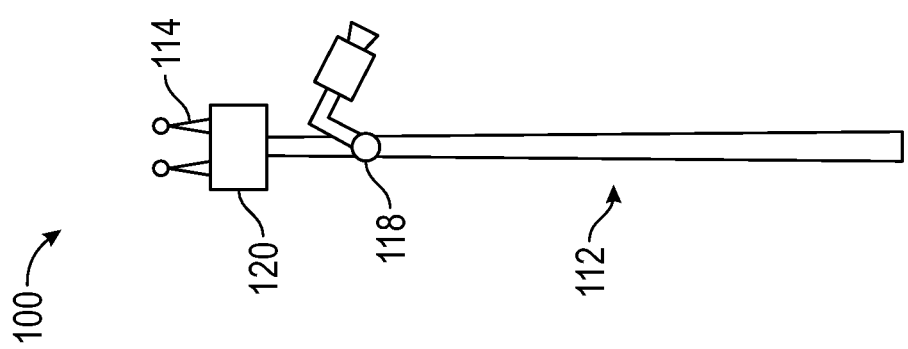

In transportation systems, potentially hazardous situations may arise when people and vehicles (collectively referred to as "agents" and/or "actors" herein) are in close proximity. Such hazardous situations may be amplified when agents are not directly visible to each other, or when the agents undertake actions that are not anticipated by counterparties. In some examples, such situations can lead to transportation inefficiencies and/or accidents.

Some examples of potentially hazardous situations may include: (1) a driver or passenger of a street-parked vehicle opening a vehicle's door in a bicyclist or vehicle driving lane, (2) a pedestrian jaywalking to cross the street, particularly at nighttime, (3) a pedestrian jogging or walking in certain environments such as neighborhoods, and the like. Further, some examples of inefficient and frustrating transportation experiences may include: (1) a driver trying to find street parking but not realizing that a vehicle is pulling out of a nearby parking spot, thus resulting in the driver driving around the block to return to the spot and discovering that the parking spot is gone, (2) a driver looking for a spot in a parking garage (or a large parking lot) and searching row by row looking for a parking spot, and the like.

In some examples, agents such as vehicles, motorbikes, mobile phones (for example, carried by pedestrians and/or cyclists), infrastructural elements, and the like may be equipped with short-range wireless communication capabilities. Such wireless communication capabilities may include vehicle-to-everything (V2X) and cellular V2X (C-V2X) communication capabilities. The agents may use the wireless communication capabilities to send wireless messages. Such wireless messages may include BSM messages or the like. The agents can mitigate the hazardous situations and/or the inefficient transportation experiences described above by communicating to one another to increase awareness of the agents' modes to initiate appropriate agent actions and/or interactions.

In various aspects, the disclosed systems may enable the agents to enter different interaction modes based on the agent's current intent and/or contextual factors as detailed below. In some examples, the disclosed systems may permit the actors to transition between interaction modes as contextual factors change. These contextual factors may include, but not be limited to, the agent's activity (for example, as determined by an analysis of data generated by corresponding sensors), predetermined conditions and parameters, and communications from other, nearby actors, to be detailed further below. In some examples, the interaction modes may determine certain aspects of an agents' communication including, but not limited to, message content, the frequency with which the agents transmit messages, the agent's filtering and processing of incoming messages, and/or the like.

Illustrative Embodiments

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used herein, a "communication system" can refer to a computer network in which vehicles and roadside units serve as communicating nodes, providing each other with information, such as safety warnings and traffic information. These components can be used to in avoiding accidents and in reducing traffic congestion. The components may include dedicated short-range communications (DSRC) devices, cellular vehicle-to-everything (V2X) devices, vehicle-to-network (V2N) devices, or other V2X-capable devices. DSRC can refer to one-way or two-way short-range to medium-range wireless communication channels specifically designed for automotive use and a corresponding set of protocols and standards.

As used herein, "vehicle-to-everything" (V2X) communication may refer to the communication of information between a vehicle and any entity that may affect the vehicle. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). In some aspects, V2X communication technology can include wide local area network (WLAN)-based, and cellular-based communications. V2X communication can include any suitable network-based V2X communication such as vehicle-to-network (V2N) or WLAN-based V2X communication. In some examples, V2N can use long-term evolution (LTE) (and its variants) as described, for example, in 3GPP standards Release 14. Moreover, V2X functionalities can support 5G, as described in connection with various standards, such as 3GPP Release 15. In some examples, the V2N can include a PC5 sidelink peer-to-peer short range communication capability.

As used herein, a "basic safety message," (BSM) can refer to an electronic message in vehicle-to-vehicle (V2V) applications. The BSM may include a low latency, localized broadcast that can be used in connection with V2V safety applications. Such V2V safety applications can be built around any suitable standard, such as a society of automotive engineers (SAE) J2735 BSM standard. In some examples, the BSM may include a first portion having vehicle data elements (vehicle size, position, speed, heading acceleration, brake system status, and/or the like), and this portion can be transmitted approximately ten times per second. In other examples, the BSM may include a second portion having a variable set of data elements drawn from optional data elements, whose availability by vehicle model can vary. This second portion may be transmitted less frequently as compared with the first portion. In some cases, the BSM can be transmitted using any suitable technique, such as DSRC, and may have a range of about 1,000 meters.

As used herein, an "infrastructural component" may include road and highway networks, including structures (bridges, tunnels, culverts, retaining walls), signage and markings, electrical systems (street lighting and traffic lights), and/or the like.

FIG. 1 shows a diagram of an environmental context for vehicle communication using dynamically configurable interaction modes, in accordance with example embodiments of the disclosure. FIG. 1 represents an environmental context 100 that includes vehicles 102, 104, and 108 and infrastructural component 112. Further, the vehicles may include a vehicle antenna such as antenna 103. The infrastructural component 112 may include an antenna 114, a camera 118, and a roadside unit 120 including a processor. The vehicle antennas may communicate messages (e.g., V2X messages) to and from between vehicles in addition to the antenna 114 of the infrastructural component 112.

While this example environmental context 100 involves parking, it is to be understood that the disclosed systems and methods may be used in a variety of other transportation scenarios in different environments. As shown in environmental context 100, vehicle 104 may be backing out of a parking spot 106 while another vehicle 102 is in close proximity. In some examples, vehicles 102 and 104 can be in particular communication modes based on their respective intents (searching for parking versus leaving parking), which can facilitate the nature of vehicles 102 and 104 subsequent interactions. In other examples, a nearby vehicle (not shown) that is driving by the parking lot may receive copies of messages wirelessly transmitted by vehicles 102 and 104. However, the nearby vehicles may not take any action based on the reception of the messages. For example, this may be because the nearby vehicle is in a communication mode that does not consider parking and thus, the nearby vehicle may not filter for messages associated with parking. Accordingly, vehicle 104 may transmit messages to surrounding vehicles (such as example vehicle 108 in the parking lot and vehicle 102). These messages may allow for vehicle 104 to announce its current mode of operation and thereby allow vehicle 102 to take appropriate action. For example, vehicles 104 and 102 may be autonomous vehicles (AVs) and therefore, vehicle 102 may determine to slow its speed and/or break until vehicle 104 is safely out of the parking spot 106. Moreover, as described further below, vehicle 104 may register the presence of vehicle 102 and become aware of the 102's intention to park in parking spot 106. If there were additional vehicles trying to park in the same parking spot 106, vehicle 104 may provide priority to vehicle 102, as described in connection with FIG. 4, below. Further, if vehicle 102 determines to park in a different parking spot or perform a different driving action, vehicle 104 may remove vehicle 102 from its registry of vehicles trying to park in parking spot 106. This may facilitate other AVs to become aware of parking spot 106 and have vehicle 104's permission to park at that parking spot. The removal of a vehicle attempting to park from the registry may not necessarily make other vehicles trying to park in parking spot 106 receive notification of the parking spot's availability. However, the removal may cause other vehicles that were previously informed about the parking spot's 106 availability to receive vehicle 104's permission to park. Moreover, vehicles such as vehicle 108 may have various intentions to leave their parking spots and can also transmit messages to the other vehicles to better coordinate their movements in the parking lot and thereby avoid collisions.

In some examples, vehicle 104 may use infrastructural component 112 to relay such messages to numerous vehicles outside the immediate wireless reach of vehicle 104's antenna. This may be useful, for example, to a vehicle that is just entering the parking lot (not shown) and may be looking for a parking spot. Such a vehicle may be initially alerted to the possibility of a parking spot opening at parking spot 106. However, when vehicle 102 determines to park in parking spot 106, vehicle 104 may transmit an updated message to the infrastructural component 112 to relay to other vehicles searching for parking. In some examples, the infrastructural component 112 can handle the advertisement, reservation, and confirmation of parking spaces in infrastructural component's 112 vicinity. In some cases, the disclosed systems may determine that vehicle 104 should not determine the next vehicle to obtain permission to park in the parking space. Accordingly, the disclosed systems may configure the infrastructural component 112 to make such a determination. Further, the updated message may indicate that parking spot 106 is no longer available.

Additionally, infrastructural component 112 may have a camera 118 that can capture images and videos of the parking lot. The captured video may be used to determine optimal parking suggestions using machine learning techniques. Further, the camera 118 may identify various opportunities for the vehicles to park in certain positions and may confirm the validity of the messages being transmitted between vehicles. The infrastructural component 112 may maintain records of the movements and interactions of the vehicles for numerous purposes including law enforcement purposes, machine learning training purposes, audit purposes, and/or the like. In some cases, some of the vehicles in the parking lot may not have interaction capabilities as described variously herein. For example, such vehicles may be dated and therefore lack the technological capability to communicate on certain short-range wireless networks with other vehicles in the parking lot. Accordingly, the infrastructural component 112 may serve to fill in the gaps in communication between such legacy vehicles and more capable current vehicles. For example, the camera 118 of the infrastructural component 112 may be used to determine the embarking and debarking of vehicles from a parking spot. The infrastructural component 112 may therefore use its antenna 114 to communicate messages to other vehicles to achieve the same results as V2V communications. The vehicles 102, 104, and 108 may include any suitable vehicle such as a motorcycle, car, truck, recreational vehicle, etc., and may be equipped with suitable hardware and software that enables it to communicate over a network, such as a local area network (LAN). As noted, the vehicles 102, 104, and 108 may include an AV as shown and described in connection with FIG. 6, below.

In another embodiment, the vehicles 102, 104, and 108 may include a variety of sensors that may aid the vehicle in navigation and interaction mode determination based on location. The sensors may include radio detection and ranging (RADAR), light detection and ranging (LIDAR), cameras, magnetometers, ultrasound, barometers, and the like (to be described below). In one embodiment, the sensors and other devices of the vehicles 102, 104, and 108 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers E IEEE) standards, and the like).

In some examples, the vehicles 102, 104, and 108 may include various location-determination devices in addition to satellite-based location-determination devices. These devices may be used to determine the interaction modes of the vehicles based on the locations, track the vehicles, provide updates on the location of a given vehicle to other vehicles, and generally support the operations described herein. For example, the vehicles 102, 104, and 108 may include magnetic positioning devices such as magnetometers, which may offer an indoor location determination capability. Magnetic positioning may be based on the iron inside buildings that create local variations in the Earth's magnetic field. Un-optimized compass chips inside devices in the vehicles 102, 104, and 108 may sense and record these magnetic variations to map indoor locations. In one embodiment, the magnetic positioning devices may be used to determine the elevation of the vehicles 102, 104, and 108. Alternatively or additionally, a barometer device may be used to determine the elevation of the vehicles 102, 104, and 108. In another embodiment, barometers and pressure altimeters may be a part of the vehicle and may measure pressure changes caused by a change in altitude of the vehicles 102, 104, and 108.

In one embodiment, the vehicles 102, 104, and 108 may use one or more inertial measurement devices (not shown) to determine the respective vehicles' position in order to track the vehicles and facilitate the determination of the interaction modes and thereby reduce the likelihood of collisions. The vehicles 102, 104, and 108 may use dead reckoning and other approaches for positioning of the vehicle using an inertial measurement unit carried by the vehicles 102, 104, and 108, sometimes referring to maps or other additional sensors to constrain the inherent sensor drift encountered with inertial navigation. In one embodiment, one or more microelectromechanical systems (MEMS) based inertial sensors may be used in the inertial measurement unit of the vehicles 102, 104, and 108; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the vehicles 102, 104, and 108.

In one embodiment, the inertial measurements may cover one or more differentials of motion of the vehicles 102, 104, and 108, and therefore, the location may be determined by performing integration functions in the software modules, and accordingly, may require integration constants to provide results. Further, the position estimation for the vehicles 102, 104, and 108 may be determined as the maximum of a two-dimensional or a three-dimensional probability distribution which may be recomputed at any time step, taking into account the noise model of all the sensors and devices involved. Based on the vehicles' motion, the inertial measurement devices may be able to estimate the vehicles' locations by one or more artificial intelligence algorithms, for example, one or more machine learning algorithms (e.g., convolutional neural networks). The disclosed systems may use any of the devices mentioned above in combination with the location-determination signals provided by the disclosed embodiments to increase the accuracy of position determination and thereby reduce the likelihood of collisions. This may be particularly useful in situations where global positioning system (GPS) signals and the like are weak (for example, in covered parking structures, tunnels, and the like).

In some examples, the infrastructural component 112 may use markers that may be placed at specific locations throughout the environment neighboring the infrastructural component 112. These markers may serve as reference points that encode that location's coordinates: latitude, longitude, and/or elevation. The markers can therefore be used to determine the location of the vehicles in case any other systems fail or are have limited accuracy. In one embodiment, the infrastructural component 112 may include cameras that may determine vehicles' locations based on visual features of the vehicles. For example, a collection of successive snapshots from a infrastructural component 112 camera can build a database of images that is suitable for estimating vehicles' location. In one embodiment, once the database is built or during the building of such a database, the infrastructural component 112 camera may take snapshots that can be interpolated into the database, yielding location coordinates. The disclosed systems can use such coordinates in conjunction with other location techniques to increase the accuracy of position determination and thereby reduce the likelihood of collisions.

In some examples, the disclosed systems can use an indoor positioning system (IPS) in connection with certain infrastructural components 112 to determine the location of the vehicles with increased accuracy, for example, in locations where satellite navigation signals are inadequate. In particular, an IPS may refer to a system to locate objects (e.g., the vehicles 102, 104, and 108) inside a building such as a parking structure using lights, radio waves, magnetic fields, acoustic signals, or other sensory information collected by mobile devices (e.g., user devices or vehicle devices). IPS's may use different technologies, including distance measurement to nearby anchor nodes (nodes with known fixed positions, e.g. Wi-Fi and/or Li-Fi access points or Bluetooth beacons, magnetic positioning, and/or dead reckoning). Such IPSs may actively locate mobile devices and tags or provide ambient location or environmental context for devices to get sensed. In one embodiment, an IPS system may determine at least three independent measurements are to unambiguously find a location of a particular vehicles 102, 104, and 108.

In some examples, the vehicles 102, 104, and 108 may have on-board units (not shown) may include microcontrollers and devices that can communicate with each other in applications without a host computer. The on-board unit may use a message-based protocol to perform internal communications. Further, the on-board unit can cause a transceiver to send and receive message (for example, V2X messages) to and from infrastructural component 112 and to other vehicles' on-board units.

In some examples, the vehicle antennas (for example, antenna 103) may include any suitable communications antenna. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the vehicles.

Further, various devices of the vehicles 102, 104, and 108 and/or the infrastructural component 112 may include any suitable radio and/or transceiver for transmitting and/or receiving radio frequency (RF) signals in the bandwidth and/or channels corresponding to the communications protocols utilized by any of the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), V2N, Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an example vehicle 102 establishes communication with another vehicle 104 and/or stablishes communication with a infrastructural component 112 device, the vehicle 102 may communicate in the downlink direction by sending data frames (e.g. a data frame which can comprise various fields such as a frame control field, a duration field, an address field, a data field, and a checksum field). The data frames may be preceded by one or more preambles that may be part of one or more headers. These preambles may be used to allow the user device to detect a new incoming data frame from the vehicle device. A preamble may be a signal used in network communications to synchronize transmission timing between two or more devices (e.g., between the vehicle 102 device and infrastructural component 112 device).

In another aspect, the environmental context 100 may include one or more satellites 130 and one or more cellular towers 132. As noted, the vehicles 102, 104, and 108 may have transceivers, which may in turn may include one or more location receivers (e.g., GNSS receivers) that may receive location signals (e.g., GNSS signals) from one or more satellites 130. In another embodiment, a receiver may refer to a device that can receive information from satellites (e.g., satellites 130) and calculate the vehicles' geographical position.

Figure 2:
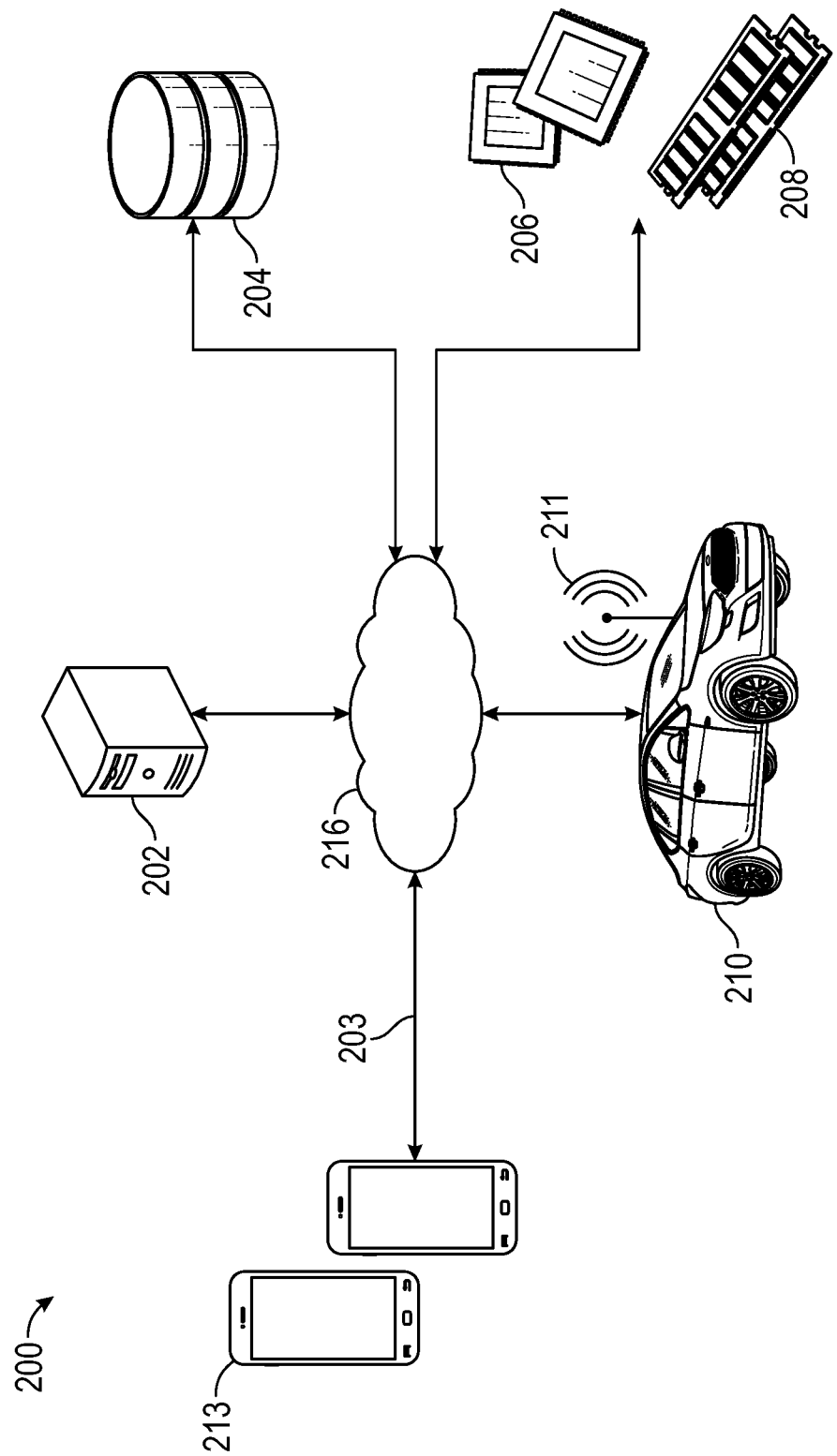
FIG. 2 shows a diagram of example components that may be used for communication using the interaction modes, in accordance with example embodiments of the disclosure.

FIG. 2 shows a diagram of example components that may be used for used for communication using the interaction modes, in accordance with example embodiments of the disclosure. In particular, diagram 200 shows computational resources including an exemplary server 202, a database 204, processor(s) 206, memory 208, and user devices 213. Diagram 200 further shows vehicles 210 that may communicate using antennas 211. In various embodiments, the various components of diagram 200 may communicate 203 over a network 216.

In another embodiment, the vehicles 210 may transmit a wireless signal using antenna 211. The wireless signal may be sent to other vehicles in proximity to the transmitting vehicle, or to infrastructural components that are part of the transportation network. A wireless signal may additionally be sent to a user device 213, for example, to inform the user regarding actions that a nearby vehicle is taking. For example, the vehicles may transmit such a wireless signal to the user device 213 such as a smartwatch to notify the user that the vehicle is passing behind a particular structure that renders the vehicle temporarily not visible. This may serve as an additional or backup mechanism to alert users as to the interaction mode(s) of the vehicles, actions of the vehicles, and the actions that drivers should perform with respect to a given vehicle.

The vehicles 210 and/or the user device may be configured to communicate with the one or more devices of the vehicle using a network 216, wirelessly or wired. The network 216 may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

As noted, the vehicles 210 may include one or more communications antennae such as antenna 211. The antennae may be any suitable type of antenna corresponding to the communications protocols used by the user device and the devices of the vehicle. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device.

Further, the vehicles 210 may include any suitable radio and/or transceiver for transmitting and/or receiving radio frequency (RF) signals in the bandwidth and/or channels corresponding to the communications protocols utilized by any of the user device and/or the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (for example, white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Diagram 200 further shows an example server 202 that may be communication with the various other components (for example, the database 204, the processor(s) 206, the memory 208, and/or the vehicles 210) over the network 216. In an embodiment, the server 202 may include a cloud-based server that may serve to store and transmit information (for example, images and video of a vehicle, historical information regarding vehicle modes and/or locations, and/or the like). Some or all of the individual components may be optional and/or different in various embodiments. In some embodiments, the server 202 may be located at the vehicles 210. In other examples, server 202 may be in communication with vehicles 210, and/or user device (not shown).

Diagram 200 further shows an example database 204. In some examples, the disclosed systems may analyze map information associated with an environment of the vehicles, previous vehicle locations in a given environment, infrastructural updates regarding the transportation network (for example, construction activity, road closures, etc.), and/or the like. The database 204 may be controlled by any suitable system, including a database management systems (DBMS), discussed further in connection with FIG. 7, below. The DBMS may use any of a variety of database models (for example, relational model, object model, etc.) and may support any of a variety of query languages to obtain information from database 204. In some examples, the database 204 may include a cloud-based database or a vehicle-based database.

Processor(s) 206 may include application processors, various coprocessors, and other dedicated processors for performing delivery analyses. Processor(s) 206 may be communicably coupled with memory 208 and configured to run the operating system, user interfaces, sensors, navigation system, communication system, image processing systems, and/or other components. In some embodiments, processor(s) 206 may include multiple dedicated or shared processors configured to perform signal processing, implement/manage real-time radio transmission operations of the vehicles 210, make navigation decisions (for example, implement obstacle avoidance routines, etc.), and the like. The volatile and nonvolatile memories found in various embodiments may include storage media for storing information such as processor-readable instructions, data structures, program modules, or other data. Some examples of information that may be stored include basic input/output systems (BIOS), operating systems, and applications.

As noted, the disclosed systems may operate in a contextual environment that includes agents. The agents may include, but not be limited to, vehicles, motorbikes, pedestrians, cyclists, roadside units, and the like which share roadways, and the agents can have wireless communications capabilities. In some examples, the wireless communication capability may include a short-range wireless communication capability. In another example, the short-range wireless communication capability may enable direct communications between agents. Direct communications between agents may refer to communication that originates from a first agent and is transmitted to a second agent in proximity to the first agent. Accordingly, direct communications may include communications between agents that may not need an enabling cellular or other similar wireless infrastructure.

Certain non-limiting embodiments of the disclosure are now described in within the context of an example scenario. The example scenario is described to facilitate explanation of the embodiments and is not meant to be limiting in any way. The scenario can include a process where two vehicles (vehicle A and vehicle B) with human drivers (driver A and driver B) park in the same parallel parking space on the side of a road in sequence. There can be a period of time elapsing between the parking of one vehicle and the parking of the other vehicle. This process can involve multiple state transitions for the agents, and each state transition may influence the way that the agents communicate with their surroundings.

More specifically, the scenario may include the following sequence of states. (1) Driver B ($D_B$) in vehicle B ($V_B$) can search for a parking space on the main street. (2) Driver A ($D_A$) can enter vehicle A ($V_A$), which may be parked in a given parallel parking space (S) on the side of a busy main street. $D_A$ may be intending to leave S. (3) $D_B$ can see an alert on a human machine interface (HMI) of $V_B$ that S is opening up ahead of $V_B$. Accordingly, $D_B$ can wait for $V_A$ to leave the space. (4) $V_A$ can leave S and $V_B$ pulls in behind $V_A$. (5) $D_B$ exits the vehicle and leaves $V_B$ to run errands.

The above scenario includes states in which several potentially hazardous situations may arise. Such potentially hazardous situations may include, but not be limited to, the following conditions. (1) As $V_A$ leaves S, $V_B$ collides with $V_A$. This may be due to the fact that $D_B$ was preoccupied looking for parking and did not notice $V_A$ pulling out in front of $V_B$. (2) $D_B$ circles around the parking lot but does not find an open space in a reasonable amount of time. (3) Other vehicles proximate to $V_B$ do not give $V_B$ adequate space, or $V_B$ hit by another vehicle while attempting to park in S. (4) $D_B$ is hit by another vehicle while exiting $V_B$, and the like.

The disclosed systems implement communications between all involved agents to enable the parallel parking of the vehicles in a coordinated, efficient, and safe fashion using the methods described below. In particular, the disclosed systems can augment the states of the vehicles in the scenario described above using interaction modes. As the different agents move through the sequence of states, the agents' interaction modes can transition to enable optimized execution of each action, as described in connection with FIG. 3. In particular, FIGS. 3A and 3B include tables that describe each state of the sequence in order and augments the description of the current state of the vehicles in each state.

Figure 3A:
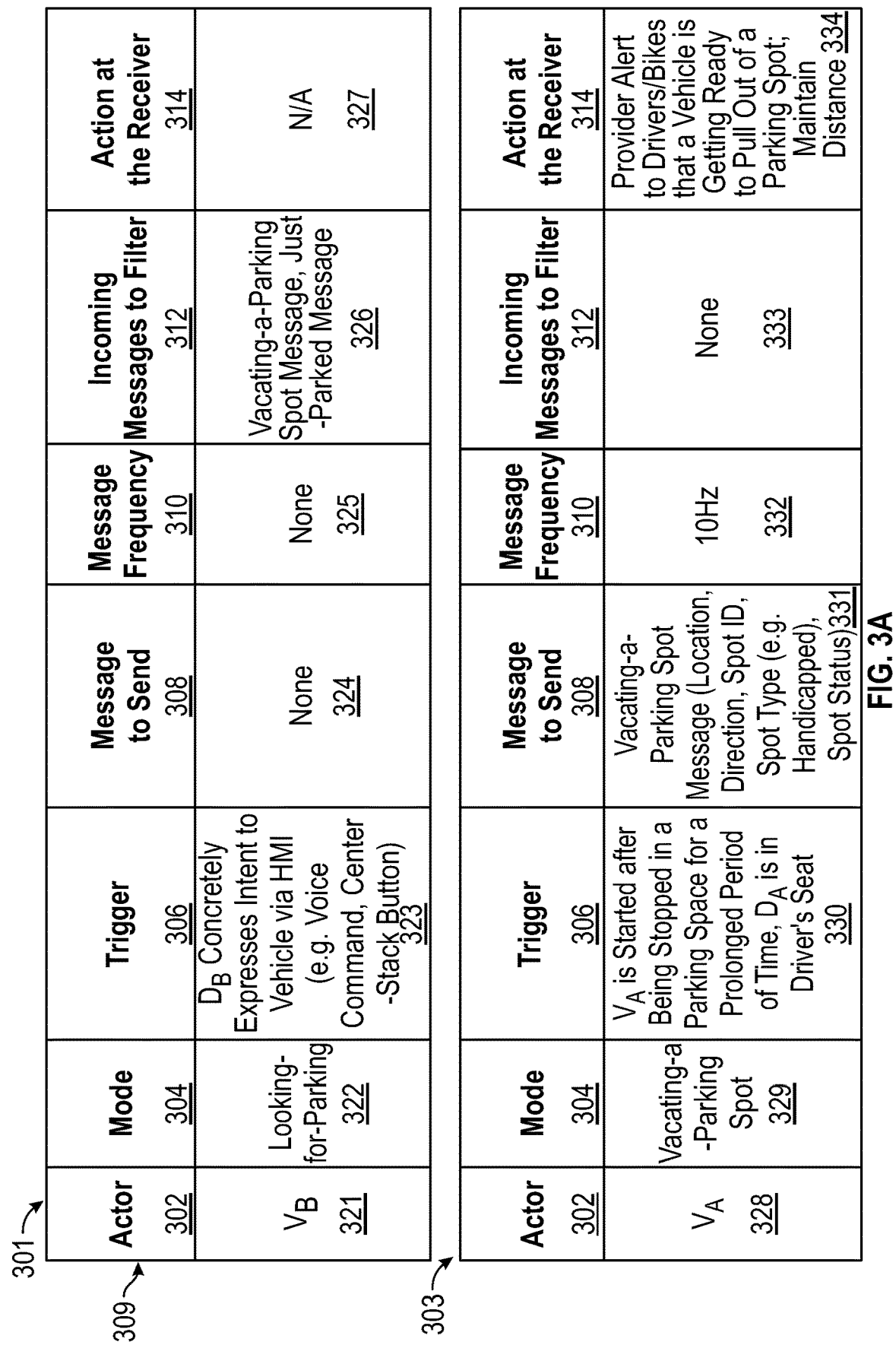
FIG. 3A illustrates tables corresponding to an example scenario for vehicle communication in a parking scenario using the interaction modes, in accordance with example embodiments of the disclosure.

FIG. 3A illustrates tables corresponding to an example scenario for vehicle communication in a parking scenario using the interaction modes, in accordance with example embodiments of the disclosure. Diagram 301 includes a table having a row 309 including an actor 302 field, a mode 304 field, a trigger 306 field, a message to send 308 field, a message frequency 310 field, an incoming messages to filter 312 field, and an action at the receiver 314 field. In particular, the actor 302 field may represent the various agents such as the vehicles in this example. The mode 304 field may represent terms describing the situation of the respective agents represented in the actor 302 field. The trigger 306 field may represent a description of a triggering event that would place the agent in the particular mode described in the mode 304 field. The message to send 308 field may include any suitable message that the agent may transmit to other agents in the environment. The message frequency 310 field may represent the frequency of transmitting such a message by the agent as described in the message to send 308 field. The incoming messages to filter 312 field may include a description of messages that the agent may look for or discard (depending on the context) while the agent is in a particular mode. The action at the receiver 314 field may describe at least one action that a receiver of a given message by the agent may be expected to perform upon receiving the message.

Condition (1) above represented a situation where driver B ($D_B$) in vehicle B ($V_B$) can search for a parking space on the main street. Diagram 303 shows that for an actor $V_B$ 321, the triggering event that causes the disclosed systems to classify $V_B$ 321 in the "looking for parking" 322 mode may include $D_B$ expressing an intent to park to the vehicle ($V_B$) via the HMI of the vehicle, as shown in field 323 of the table. In some examples, $D_B$ may express the intent to park the vehicle via an HMI of the vehicle. For instance, $V_B$ may provide a voice command, or a push of center-stack button of a console of the vehicle to indicate such an intent. In this state, there may be no messages to send as represented by the entry of "none" 324 field in the table. Accordingly, there may also not be any message frequency as represented by the entry of "none" 325 field in the table. Moreover, the disclosed systems may search for incoming messages including a "vacating a parking spot" message or a "just parked" message as represented in field 326 of the table. Such incoming messages may be indicative of a vehicle leaving a parking spot that $V_B$ may be able to park in. Moreover, in this state, there may be no actions to take at the receiver of transmitted messages by $V_B$, as indicated by the "N/A" in field 327 of the table.

Condition (2) above represented a situation where driver A ($D_A$) can enter vehicle A ($V_A$), which may be parked in a given parallel parking space (S) on the side of a busy main street. $D_A$ may be intending to leave S. Diagram 303 shows that for an actor $V_B$ 328, the triggering event that causes the disclosed systems to classify $V_B$ 321 in the "vacating a parking spot" 329 mode may include $V_A$ being engaged after being stopped in a parking space for a prolonged period of time and a corresponding driver $D_A$ being in the driver seat of $V_A$, as shown in field 330 of the table. In this state, the vehicle $V_A$ may transmit a "vacating a parking spot" message as represented by entry 331 in the table. The message may further include, but not be limited to, a location information, a direction information, a spot identifier information, a spot type information (for example, handicapped spot type), a spot status information, and the like. In this case, $V_A$ may transmit the messages with a message transmission frequency of about 10 Hz as represented by entry 325 in the table. Moreover, the disclosed systems may not search for incoming messages as represented in field 333 of the table. Moreover, in this state, there may be actions to take at the receiver of transmitted messages by $V_A$. For example, a receiver may provide alerts to drivers and/or bikes that a vehicle is attempting to pull out of the parking spot, and for the receiver to maintain an adequate distance from the vehicle, as indicated by the entry in field 327 of the table.

Condition (3) above represented a situation where $D_B$ can see an alert on a human machine interface (HMI) of $V_B$ that S is opening up ahead of $V_B$. Accordingly, $D_B$ can wait for $V_A$ to leave the space. In this condition, the disclosed systems may not indicate a change in the interaction modes of the vehicles.

Condition (4) above represented a situation where $V_A$ can leave S and $V_B$ pulls in behind $V_A$. Diagram 305 shows that for actor VB 335, when VB engages an active parking system as represented in field 337, the disclosed systems may place $V_B$ in a "parking in progress" 336 mode. In this state, the vehicle $V_A$ may transmit a "parking in progress" message as represented by entry 338 in the table. The message may further include a location information, a heading information, a spot identifier information, and the like as further shown by entry 338. In this case, $V_A$ may transmit the messages with a message transmission frequency of about 3 Hz as represented by entry 339 in the table. Moreover, the disclosed systems may not search for incoming messages as represented in field 340 of the table. Moreover, in this state, there may be actions to take at the receiver of transmitted messages by $V_A$. For example, a receiver may provide alerts for the receiver to maintain an adequate distance from the vehicle, as indicated by the entry in field 341 of the table.

Diagram 305 further shows that for actor $V_B$ 342, when $V_B$ determines that $V_B$ is in designated parking zone on a digital map and confirms with $V_B$ sensors that sees the curb is less than about 12 inches away, as represented in field 344, the disclosed systems may place $V_B$ in a "just parked" 343 mode. In this state, the vehicle $V_A$ may transmit a "just parked" message as represented by entry 345 in the table. The message may further include a location information, a heading information, a spot identifier information, and the like as further shown by entry 338. In this case, $V_A$ may transmit the messages with a message transmission frequency of about 3 Hz as represented by entry 346 in the table. Moreover, the disclosed systems may not search for incoming messages as represented in field 347 of the table. Moreover, in this state, there may be actions to take at the receiver of transmitted messages by $V_A$. For example, a receiver may indicate to nearby vehicles looking for parking that parking spot S is no longer open, as indicated by the entry in field 348 of the table.

Condition (5) above represented a situation where $D_B$ exits the vehicle and leaves $V_B$ to run errands. Diagram 307 shows that for actor $D_B$ 340, when $V_B$ is turned off in a designated parking zone, and the disclosed systems determine that weight is shifting in the driver's seat as $D_B$ prepares to exit $V_B$ as represented in field 352 the disclosed systems may place $V_B$ in a "exiting vehicle roadside" 351 mode. In this state, the vehicle $V_A$ may transmit a "high-alert pedestrian safety" message as represented by field 352 in the table. The message may further include a position information, a heading information, a high-alert flag, and the like as further shown by entry 353. In this case, $V_A$ may transmit the messages with a message transmission frequency of about 20 Hz as represented by entry 354 in the table. Moreover, the disclosed systems may search for incoming messages including a basic safety message as represented in field 355 of the table. Moreover, in this state, there may be actions to take at the receiver of transmitted messages by $V_A$. For example, a receiver may provide alerts for drivers indicating that a pedestrian is in a vulnerable state and to either slow down or stop their respective vehicles, as indicated by the entry in field 356 of the table.

As is demonstrated in the above sequence, the disclosed systems can enable heightened awareness of all nearby actors. This awareness is critical to safe and efficient navigation of complex scenarios.

It is to be understood that the example described above does not represent a comprehensive list of the aspects of agent to agent communication that can be modified based on an active communication mode. Rather, the aspects represent the salient features for this example action sequence. In other cases, different communication aspects may be used as the need arises. For example, during a rideshare pickup, additional layers of authentication/security may be important to verify the identity and authenticity of the driver for a corresponding passenger, so that the passenger is confident that the vehicle is safe to enter. In a case where a pedestrian is looking to cross the street, the pedestrian may seek an acknowledgment from nearby vehicles to ensure that the drivers of such vehicles are aware of the pedestrian crossing taking place.

It is also possible for the devices to engage in a multi-exchange conversation in certain modes. For example, when $V_A$ is ready to vacate S and enters a "vacating a parking spot" mode, $V_A$ can transmit periodic messages corresponding to such a mode. Vehicles in a "looking for parking mode" can filter incoming messages for "vacating a parking spot" messages. When such vehicles find a parking spot that meets predetermined location criteria, the vehicles can respond to $V_A$ with a "reserve spot" message. Whichever vehicle is currently reserving the parking spot (in this case, $V_A$) but is vacating the spot, can choose the vehicle that can park in the spot after the vehicle vacates the spot. In particular, the vehicle can receive one or more reservation requests and can use fixed logic to choose the next vehicle to reserve the parking spot. An example of such logic can involve analyzing timestamps from the vehicles to determine how long the vehicles have been in "looking for parking" mode. The disclosed systems can then provide the space to the vehicle that has been waiting the longest, assuming that the vehicle is within a certain distance threshold.

Figure 4:
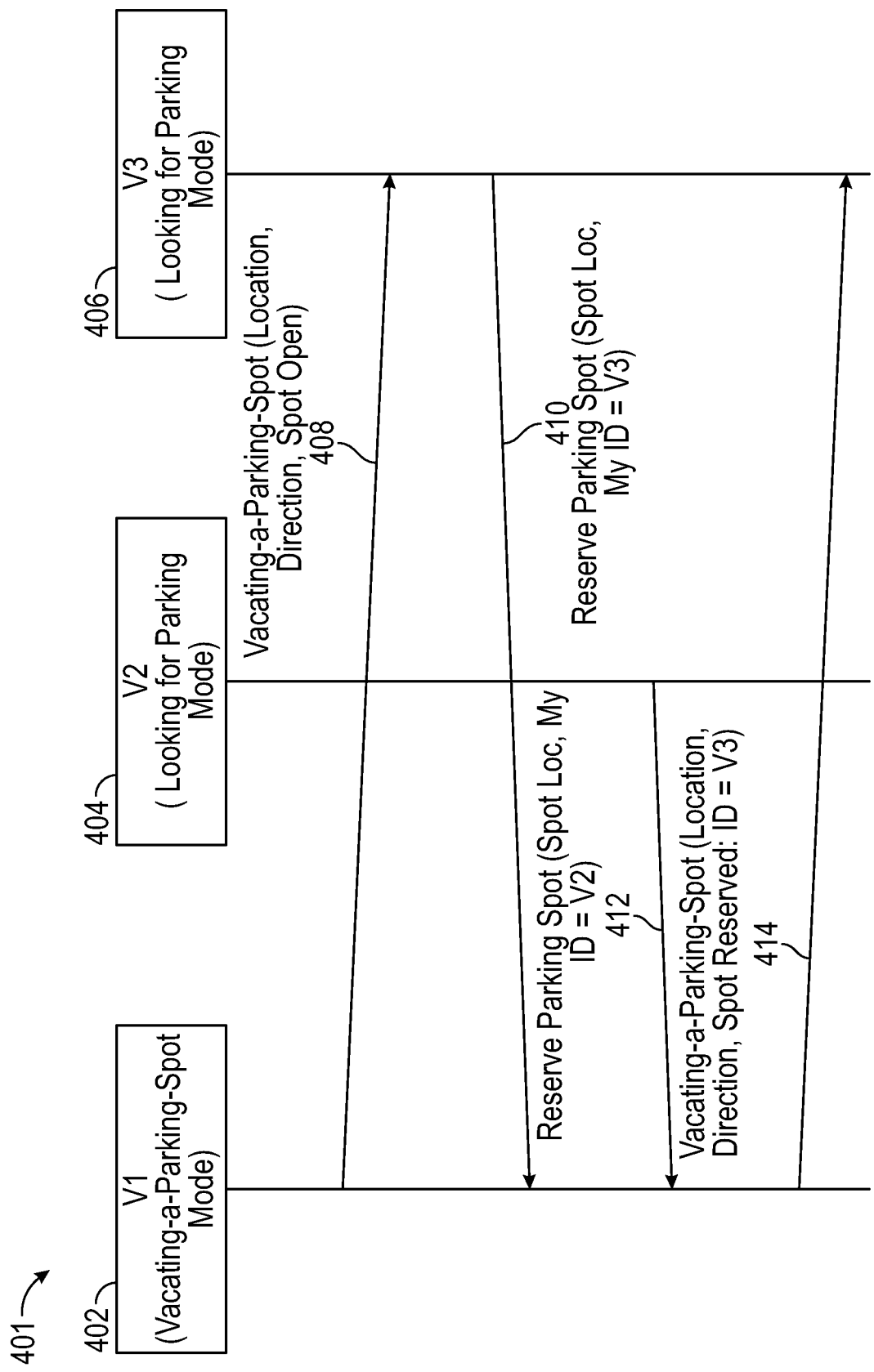
FIG. 4 shows an example sequence diagram illustrating example communications between vehicles in a parking scenario, in accordance with example embodiments of the disclosure.

FIG. 4 shows an example sequence diagram illustrating example communications between vehicles in a parking scenario, in accordance with example embodiments of the disclosure. In particular, diagram 401 represents a sequence diagram of messages that may be transmitted between various agents. In particular, the agents may include a first vehicle V1 402, a second vehicle V2 404, and a third vehicle V3 406. In this example, V1 402 may represent a vehicle that is in a "vacating a parking spot" mode. Similarly, V2 404 may represent a vehicle that is in a "looking for parking" mode. V3 406 may be in a "looking for parking" mode. Continuing with the example, at stage 408, V1 402 may transmit a message including "vacating a parking spot" message and/or a location information, a direction information, an open spot notification information, and the like to V3 406. At stage 410, V3 406 may transmit a message to V1 402, the message indicative of V3 406's request to reserve the parking spot occupied by V1 402. The message may further include a parking spot location and a unique identifier of V3. At stage 412, V2 404 may also transmit a message to V1 402, the message indicative of V2 404's request to reserve the same parking spot occupied by V1 402. The message may also include the parking spot location and a unique identifier of V2. As noted, at stage 414, V1 402 may transmit a message to V3 406 including the "vacating a parking spot" message in addition to V1 402's location, direction, and an indication that the parking spot is reserved for V3.

In some examples, a single agent may be in a variety of different modes at once. For example, a first vehicle could simultaneously signal to other vehicles that the first vehicle is pulling into a parking space. At substantially the same time, the first vehicle may also signal to nearby pedestrians that the first vehicle is looking for a specific person that ordered a ride to a sporting event. The disclosed systems may use such multimode operation by the agents optionally in combination with the V2X technology to further expand possible recipient actions.

In some examples, infrastructure can mediate interactions between agents. For example, in the parking sequence example described above, infrastructure (for example, roadside infrastructure or parking garage infrastructure) can monitor vehicles vacating spots and vehicles searching for parking spots. The infrastructure can mediate the reservation process in addition to guiding vehicles to the open parking spots. For example, the infrastructure can serve to facilitate longer-range communication between agents that might ordinarily not be able to communicate within a predetermined distance threshold of one another. In another example, the infrastructure can maintain statistics and/or lists of open and reserve parking spots and may use this information in directing vehicles to maximize parking utilization.

Figure 5:
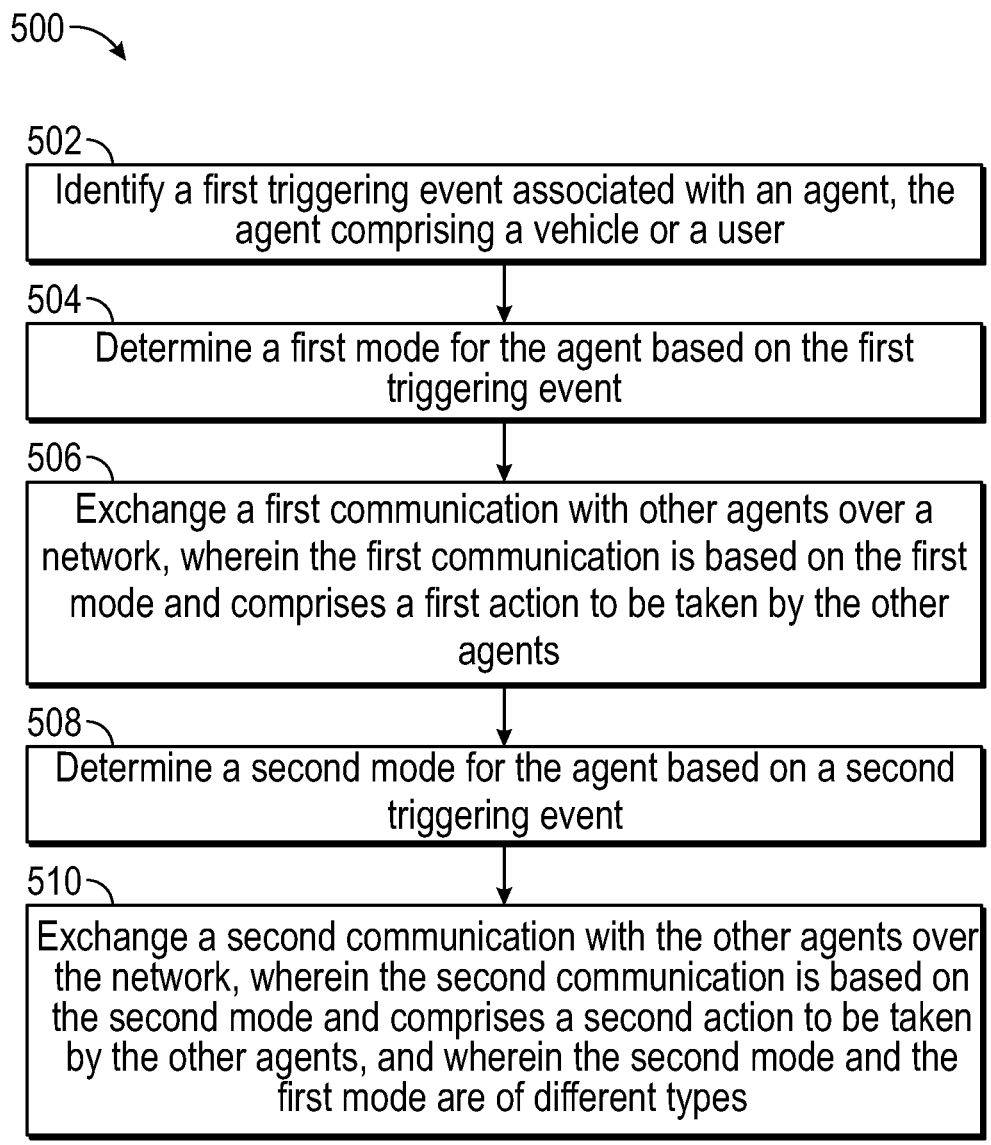
FIG. 5 show example process flows describing a method of vehicle communication using dynamically configurable interaction modes, in accordance with example embodiments of the disclosure.

FIG. 5 show example process flows describing a method of vehicle communication using dynamically configurable interaction modes, in accordance with example embodiments of the disclosure. At block 502, the method can include identifying a first triggering event associated with an agent, the agent comprising a vehicle or a user. In some examples, identifying the first triggering event can include determining a manual input or a voice input by the user. For example, the user may speak to a voice-recognition device of the vehicle, and the disclosed systems may parse the voice input and identify a mode based on the contents of the voice input. The user may say, for example, "entering parking mode", and the disclosed systems may determine that the vehicle is in parking mode. Alternatively or additionally, the user may press a button on a console of the vehicle to signify a mode. In other embodiments, the triggering event may be determined automatically via an analysis of the sensor data input by the vehicle. For example, location-determination sensors may indicate that the vehicle is entering a parking lot, and therefore, the vehicle can be transitioned to a parking mode.

At block 504, the method can include determining a first mode for the agent based on the first triggering event. In particular, the disclosed systems may query a database (internal or external to the vehicle) to determine the first mode based on the content of user input or based on an analysis of sensor data. For example, the database may include conditions and instructions under which certain sensor data cause the disclosed systems to determine that the agent is in the first mode. For example, the database may include instructions that if the agent enters the location of a parking lot and has a speed at a particular threshold for a certain duration of time, the disclosed systems determine that the agent is in a first mode, the first mode indicative of a parking mode.

At block 506, the method can include exchanging a first communication with other agents over a network, wherein the first communication is based on the first mode and comprises a first action to be taken by the other agents. In particular, the exchange of the first communications may include broadcasting, by the agent, an outgoing message at a frequency, the frequency based on the first mode. These outgoing messages may indicate the state of the agent (e.g., interaction mode, speed, heading, etc.). In some cases the agent may filter, based on the first mode, a plurality of messages from the other agents to identify an incoming message that is applicable to the agent. For example, if the agent is in a parking mode, it may ignore messages associated with a highway driving mode from vehicles that are driving on a highway in proximity to the vehicle. This can save bandwidth and increase the speed and efficiency of communications.

In some examples, the exchange of the first communication can include relaying, using an infrastructural component, the first communication over the network to at least a portion of the other agents that are beyond a threshold distance from the agent. For example, the agent can transmit communications to vehicles that are further out than the range of antenna of the agent's vehicle antenna. In other examples, the agent can relay, to a second agent, the first communication over the network to at least a portion of the other agents that are beyond a threshold distance from the agent. The second agent can thereby serve as a relay for the agent. In some examples, the first action can include providing at least a portion of the other agents with an alert message based on the first mode. For example, the alert message can indicate to the other agents to provide a message that describes that the other agents are stopping due to a parking mode of the agent. The exchange of the first communication can include computer-executable instructions to exchange a first message with the other agents over the network using a V2X, a C-V2X protocol, or any other suitable protocol.

At block 508, the method can include determining a second mode for the agent based on a second triggering event. The determining the second mode for the agent based on a second triggering event can be similar to the include determining a first mode for the agent based on a first triggering event, as described above.

At block 510, the method can include exchanging a second communication with the other agents over the network, wherein the second communication is based on the second mode and comprises a second action to be taken by the other agents, and wherein the second mode and the first mode are of different types. The exchanging a second communication with the other agents over the network can be similar to exchanging the first communication with the other agents as described above.

The method can include determining a third mode for the agent based on the first triggering event. The determining the third mode for the agent based on the first triggering event can be similar to the include determining a first mode for the agent based on a first triggering event, as described above. The third mode can be determined at substantially the same time as the first mode. In other words, one triggering event can lead to the triggering of multiple modes. The method can include exchanging a third communication with the other agents over the network, wherein the third communication is based on the first mode.

Further, as noted, embodiments of devices and systems (and their various components) described herein can employ artificial intelligence (AI) to facilitate automating one or more features described herein. The components can employ various AI-based schemes for carrying out various embodiments and/or examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources (e.g., different sensor inputs). Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 6:
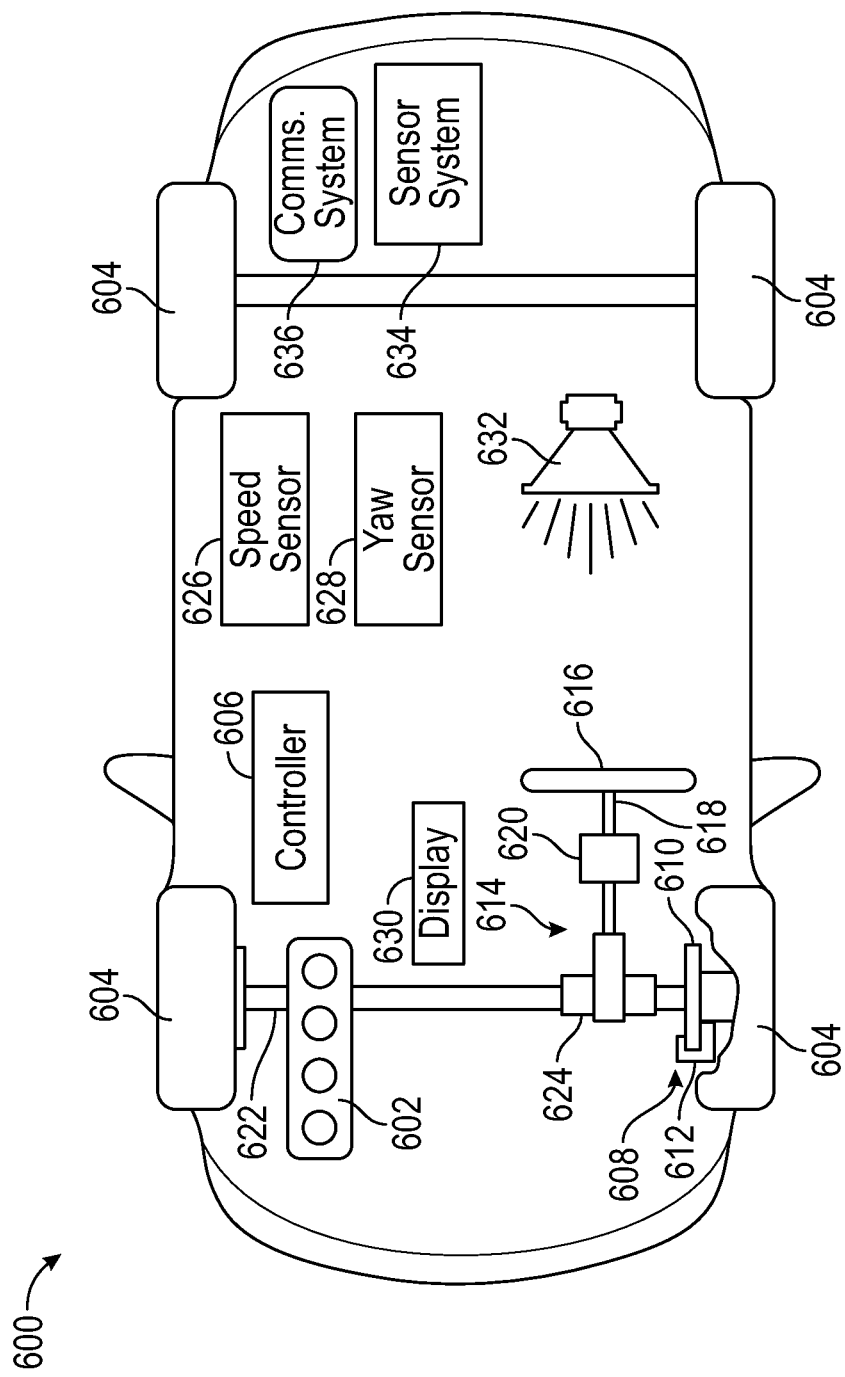
FIG. 6 is a schematic illustration of an example autonomous vehicle (AV) that can communicate to other vehicles with configurable interaction modes using the disclosed systems and methods, in accordance with one or more embodiments of the disclosure.

FIG. 6 is a schematic illustration of an example autonomous vehicle, in accordance with one or more embodiments of the disclosure. As noted, the vehicle (for example, vehicle 102 shown and described in connection with FIG. 1, above), may include an AV. Referring to FIG. 6, an example vehicle 600 may include a power plant 602 (such as a combustion engine and/or an electric motor) that provides torque to driven wheels 604 that propel the vehicle forward or backward.

Autonomous vehicle operation, including propulsion, steering, braking, navigation, and the like, may be controlled autonomously by a vehicle controller 606. For example, the vehicle controller 606 may be configured to receive feedback from one or more sensors (for example, sensor system 634, etc.) and other vehicle components to determine road conditions, vehicle positioning, and so forth. The vehicle controller 606 may also ingest data form various sensors such as speed monitor and yaw sensor, as well as the tires, brakes, motor, and other vehicle components. The vehicle controller 606 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 606 may be configured to interact with the user by communicating with the user's user device.

The vehicle controller 606 may include one or more computer processors coupled to at least one memory. The vehicle 600 may include a braking system 608 having disks 610 and calipers 612. The vehicle 600 may include a steering system 614. The steering system 614 may include a steering wheel 616, a steering shaft 618 interconnecting the steering wheel to a steering rack 620 (or steering box). The front and/or rear wheels 604 may be connected to the steering rack 620 via axle 622. A steering sensor 624 may be disposed proximate the steering shaft 618 to measure a steering angle. The vehicle 600 also includes a speed sensor 626 that may be disposed at the wheels 604 or in the transmission. The speed sensor 626 is configured to output a signal to the controller 606 indicating the speed of the vehicle. A yaw sensor 628 is in communication with the controller 606 and is configured to output a signal indicating the yaw of the vehicle 600.

The vehicle 600 includes a cabin having a display 630 in electronic communication with the controller 606. The display 630 may be a touchscreen that displays information to the passengers of the vehicle and/or functions as an input. A person having ordinary skill in the art will appreciate that many different display and input devices are available and that the present disclosure is not limited to any particular display. An audio system 632 may be disposed within the cabin and may include one or more speakers for providing information to users that pickup items. The audio system 632 may also include a microphone for receiving voice inputs or detecting sounds at the residence (for example, animal sounds). The vehicle may include a communications system 636 that is configured to send and/or receive wireless communications via one or more networks. The communications system 636 may be configured for communication with devices in the car or outside the car, such as a user's device, the delivery vehicles, etc.

The vehicle 600 may also include a sensor system for sensing areas external to the vehicle. The sensor system may include a plurality of different types of sensors and devices such as cameras, ultrasonic sensors, RADAR, LIDAR, and/or combinations thereof. The sensor system may be in electronic communication with the controller 606 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 606 may receive signals from the sensor system 634 and may include memory containing machine-readable instructions for processing the data from the sensor system. The controller 606 may be programmed to output instructions to at least the display 630, the audio system 632, the steering system 614, the braking system 608, and/or the power plant 602 to autonomously operate the vehicle 600.

Figure 7:
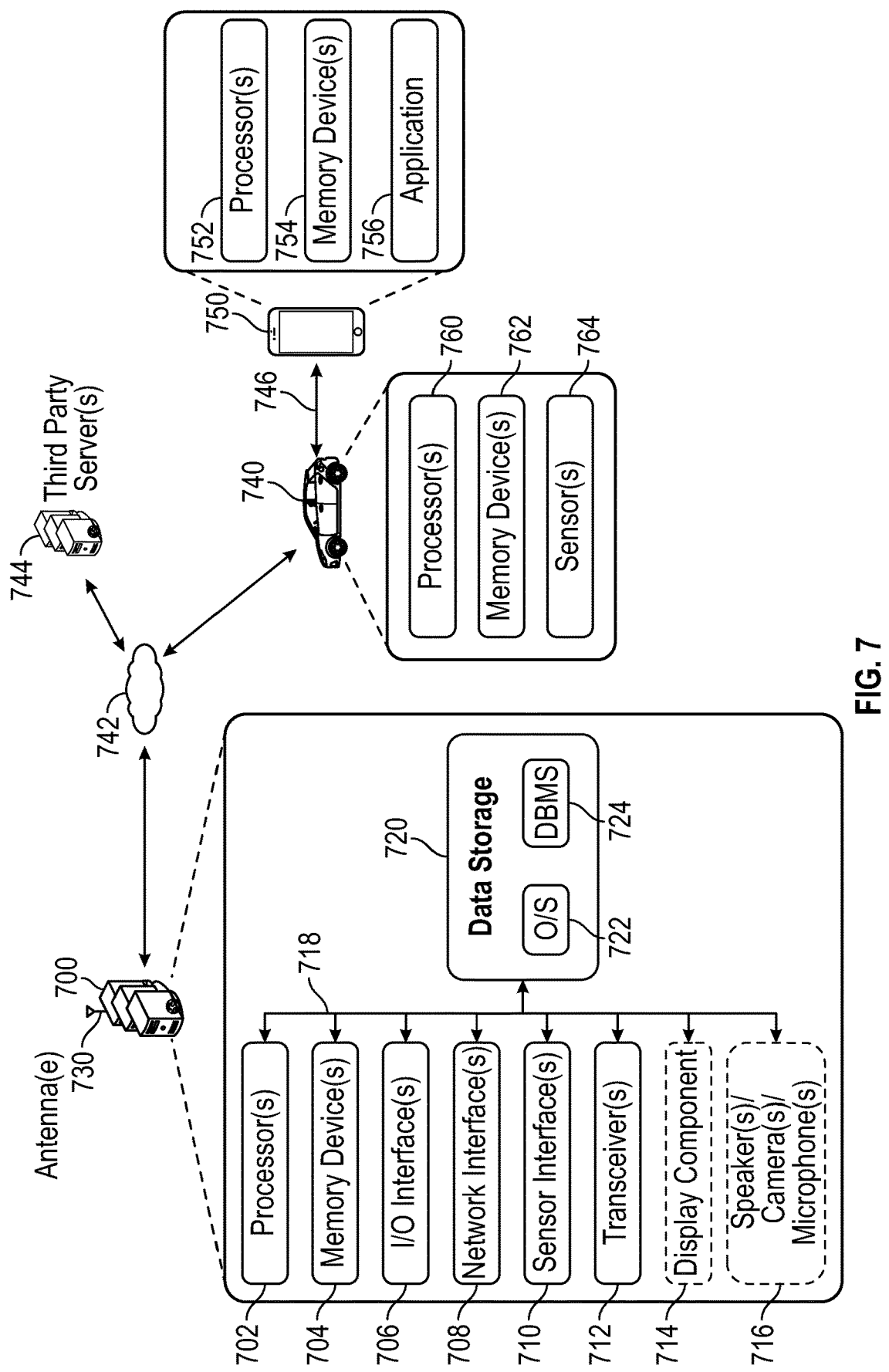
FIG. 7 is a schematic illustration of an example server architecture for one or more servers that can be used for vehicle communication using dynamically configurable interaction modes, in accordance with one or more embodiments of the disclosure.

FIG. 7 is a schematic illustration of an example server architecture for one or more server(s) 700 in accordance with one or more embodiments of the disclosure. The server 700 illustrated in the example of FIG. 7 may correspond to a server that may be used by a vehicle (for example, any of vehicles 102, 104, and/or 106 as shown and described in connection with FIG. 1, above) on a network associated with the vehicle, a delivery vehicle, or a user device. In an embodiment, the server 700 may include a cloud-based server that may serve to store and transmit information (for example, images and video of a user, a user residence, and the like). Some or all of the individual components may be optional and/or different in various embodiments. In some embodiments, at least one of the servers described FIG. 7 may be located at an autonomous vehicle.

The server 700 may be in communication with a AV 740, and one or more user devices 750. The AV 740 may be in communication with the one or more user devices 750. Further, the server 700, the AV 740, and/or the user devices 750 may be configured to communicate via one or more networks 742. The AV 740 may additionally be in wireless communication over one or more network(s) 742 with the user devices 750 via a connection protocol such as Bluetooth or NFC. Such network(s) 742 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 700 may include one or more processors 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display components 714, one or more optional speakers(s)/camera(s)/microphone(s) 716, and data storage 720. The server 700 may further include one or more bus(es) 718 that functionally couple various components of the server 700. The server 700 may further include one or more antenna(e) 730 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 718 may include at least one of a system bus, a memory bus, an address bus, or a message bus, and may permit the exchange of information (for example, data (including computer-executable code), signaling, etc.) between various components of the server 700. The bus(es) 718 may include, without limitation, a memory bus or a memory controller, a peripheral bus, an accelerated graphics port, and so forth. The bus(es) 718 may be associated with any suitable bus architecture.

The memory 704 of the server 700 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 720 may include removable storage and/or non-removable storage including, but not limited to, magnetic storage, optical disk storage, and/or tape storage. The data storage 720 may provide non-volatile storage of computer-executable instructions and other data.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. More specifically, the data storage 720 may store one or more operating systems (O/S) 722; one or more database management systems (DBMS) 724; and one or more program module(s), applications, engines, computer-executable code, scripts, or the like. Some or all of these component(s) may be sub-component(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The processor(s) 702 may be configured to access the memory 704 and execute the computer-executable instructions loaded therein. For example, the processor(s) 702 may be configured to execute the computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit.

Referring now to other illustrative components depicted as being stored in the data storage 720, the 0/S 722 may be loaded from the data storage 720 into the memory 704 and may provide an interface between other application software executing on the server 700 and the hardware resources of the server 700.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (for example, relational model, object model, etc.) and may support any of a variety of query languages.

Referring now to other illustrative components of the server 700, the input/output (I/O) interface(s) 706 may facilitate the receipt of input information by the server 700 from one or more I/O devices as well as the output of information from the server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 706 may also include a connection to one or more of the antenna(e) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 700 may further include one or more network interface(s) 708 via which the server 700 may communicate with any of a variety of other systems, platforms, networks, devices, and so forth. The network interface(s) 708 may enable communication, for example, with one or more wireless routers, one or more host servers, one or more web servers, and the like via one or more networks.

The sensor(s)/sensor interface(s) 710 may include or may be capable of interfacing with any suitable type of sensing device such as, for example, inertial sensors, force sensors, thermal sensors, photocells, and so forth.

The display component(s) 714 may include one or more display layers, such as LED or LCD layers, touch screen layers, protective layers, and/or other layers. The optional camera(s) of the speakers(s)/camera(s)/microphone(s) 716 may be any device configured to capture ambient light or images. The optional microphone(s) of the speakers(s)/camera(s)/microphone(s) 716 may be any device configured to receive analog sound input or voice data. The microphone(s) of the speakers(s)/camera(s)/microphone(s) 716 may include microphones used to capture sound.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

The user device 750 may include one or more computer processor(s) 752, one or more memory devices 754, and one or more applications, such as a vehicle application 756. Other embodiments may include different components.

The processor(s) 752 may be configured to access the memory 754 and execute the computer-executable instructions loaded therein. For example, the processor(s) 752 may be configured to execute the computer-executable instructions of the various program module(s), applications, engines, or the like of the device to cause or facilitate various operations to be performed in accordance with one or more embodiments of the disclosure. The processor(s) 752 may include any suitable processing unit capable of accepting data as input, processing the input data in accordance with stored computer-executable instructions, and generating output data. The processor(s) 752 may include any type of suitable processing unit.

The memory 754 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 750, the AV application 756 may be a mobile application executable by the processor 752 that can be used to present options and/or receive user inputs of information related to the disclosed embodiments. In addition, the user device 750 may communicate with the AV 740 via the network 742 and/or a direct connect, which may be a wireless or wired connection. The user device 750 may include a camera, scanner, bio reader or the like to capture biometric data of a user, perform certain processing step on the biometric date, such as extracting features from captures biometric data, and then communicated those extracted features to one or more remote servers, such as one or more of cloud-based servers.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

Example Embodiments

In some instances, the following examples may be implemented together or separately by the systems and methods described herein.

Example 1 may include a device, comprising: at least one memory device that stores computer-executable instructions; and at least one processor configured to access the at least one memory device, wherein the at least one processor is configured to execute the computer-executable instructions to: identify a first triggering event associated with an agent, the agent comprising a vehicle or a user; determine a first mode for the agent based on the first triggering event; exchange a first communication with other agents over a network, wherein the first communication is based on the first mode and comprises a first action to be taken by the other agents; determine a second mode for the agent based on a second triggering event; and exchange a second communication with the other agents over the network, wherein the second communication is based on the second mode and comprises a second action to be taken by the other agents, and wherein the second mode and the first mode are different.

Example 2 may include the device of example 1 and/or some other example herein, wherein the computer-executable instructions further comprise computer-executable instructions to: determine a third mode for the agent based on the first triggering event; and exchange a third communication with the other agents over the network, wherein the third communication is based on the first mode.

Example 3 may include the device of example 1 and/or some other example herein, wherein the computer-executable instructions to identify the first triggering event comprise computer-executable instructions to determine a manual input or a voice input by the user.

Example 4 may include the device of example 1 and/or some other example herein, wherein the computer-executable instructions to exchange the first communication comprises computer-executable instructions to broadcast, by the agent, an outgoing message at a frequency, the frequency based on the first mode.

Example 5 may include the device of example 1 and/or some other example herein, wherein the computer-executable instructions to exchange the first communication comprise computer-executable instructions to filter, by the agent and based on the first mode, a plurality of messages from the other agents to identify an incoming message that is applicable to the agent.

Example 6 may include the device of example 1 and/or some other example herein, wherein the computer-executable instructions to exchange the first communication comprise computer-executable instructions to relay, using an infrastructural component, the first communication over the network to at least a portion of the other agents that are beyond a threshold distance from the agent.

Example 7 may include the device of example 1 and/or some other example herein, wherein the computer-executable instructions to exchange the first communication comprise computer-executable instructions to relay, to a second agent, the first communication over the network to at least a portion of the other agents that are beyond a threshold distance from the agent.

Example 8 may include the device of example 1 and/or some other example herein, wherein the first action includes providing at least a portion of the other agents with an alert message based on the first mode.

Example 9 may include the device of example 1 and/or some other example herein, wherein the computer-executable instructions to exchange the first communication comprises comprise computer-executable instructions to exchange a first message with the other agents over the network using a vehicle-to-everything (V2X) or a cellular V2X (C-V2X) protocol.

Example 10 may include a system, comprising: at least one memory device that stores computer-executable instructions; and at least one processor configured to access the at least one memory device, wherein the at least one processor is configured to execute the computer-executable instructions to: identify a first triggering event associated with an agent, the agent comprising a vehicle or a user; determine a first mode for the agent based on the first triggering event; exchange a first communication with other agents over a network, wherein the first communication is based on the first mode and comprises a first action to be taken by the other agents; determine a second mode for the agent based on a second triggering event; exchange a second communication with the other agents over the network, wherein the second communication is based on the second mode and comprises a second action to be taken by the other agents, and wherein the second mode and the first mode are of different types; determine a third mode for the agent based on the first triggering event; and exchange a third communication with the other agents over the network, wherein the third communication is based on the first mode.

Example 11 may include the system of example 10 and/or some other example herein, wherein the computer-executable instructions further comprise computer-executable instructions to: exchange a first message with the other agents over the network using a vehicle-to-everything (V2X) or a cellular V2X (C-V2X) protocol.

Example 12 may include the system of example 10 and/or some other example herein, wherein the computer-executable instructions to identify the first triggering event comprise computer-executable instructions to determine a manual input or a voice input by the user.

Example 13 may include the system of example 10 and/or some other example herein, wherein the computer-executable instructions to exchange the first communication comprises computer-executable instructions to broadcast, by the agent, an outgoing message at a frequency, the frequency based on the first mode.

Example 14 may include the system of example 10 and/or some other example herein, wherein the computer-executable instructions to exchange the first communication comprise computer-executable instructions to filter, by the agent and based on the first mode, a plurality of messages from the other agents to identify an incoming message that is applicable to the agent.

Example 15 may include the system of example 10 and/or some other example herein, wherein the computer-executable instructions to exchange the first communication comprise computer-executable instructions to perform at least one of: relaying, using an infrastructural component, the first communication over the network to at least a portion of the other agents that are beyond a threshold distance from the agent, or relaying, to a second agent, the first communication over the network to at least the portion of the other agents that are beyond the threshold distance from the agent.

Example 16 may include a method, comprising: identifying a first triggering event associated with an agent, the agent comprising a vehicle or a user; determining a first mode for the agent based on the first triggering event; exchanging a first communication with other agents over a network, wherein the first communication is based on the first mode and comprises a first action to be taken by the other agents; determining a second mode for the agent based on a second triggering event; and exchanging a second communication with the other agents over the network, wherein the second communication is based on the second mode and comprises a second action to be taken by the other agents, and wherein the second mode and the first mode are of different types.

Example 17 may include the method of example 16 and/or some other example herein, further comprising: determining a third mode for the agent based on the first triggering event; and exchanging a third communication with the other agents over the network, wherein the third communication is based on the first mode.

Example 18 may include the method of example 16 and/or some other example herein, further comprising determining a manual input or a voice input by the user.

Example 19 may include the method of example 16 and/or some other example herein, further comprising filtering, by the agent and based on the first mode, a plurality of messages from the other agents to identify an incoming message that is applicable to the agent.

Example 20 may include the method of example 16 and/or some other example herein, wherein the exchanging the first communication further comprises: relaying, using an infrastructural component, the first communication over the network to at least a portion of the other agents that are beyond a threshold distance from the agent, or relaying, to a second agent, the first communication over the network to at least the portion of the other agents that are beyond the threshold distance from the agent.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, comprising:
    at least one memory device that stores computer-executable instructions; and
    at least one processor configured to access the at least one memory device, wherein the at least one processor is configured to execute the computer-executable instructions to:
        identify a first triggering event associated with a first vehicle;
        determine a first interaction mode for the first vehicle based on the first triggering event;
        send, from the first vehicle, a first communication to a second vehicle and a third vehicle, the first communication including the first interaction mode of the first vehicle;
        receive, from the second vehicle, a second communication indicating that the second vehicle is in a second interaction mode;
        receive, from the third vehicle, a third communication indicating that the third vehicle is in the second interaction mode;
        filter, by the first vehicle, a fourth communication from a fourth vehicle based on an indication in the fourth communication that the fourth vehicle is in an interaction mode other than the second interaction mode;
        determine that an amount of time the second vehicle has been in the second interaction mode is greater than an amount of time the third vehicle has been in the second interaction mode; and
        send, by the first vehicle, an indication for the second vehicle to change to the first interaction mode or a fourth interaction mode based on the determination that the amount of time the second vehicle has been in the second interaction mode is greater than the amount of time the third vehicle has been in the second interaction mode.

2. The device of claim 1, wherein the computer-executable instructions further comprise computer-executable instructions to:
    determine a fifth interaction mode for the first vehicle based on the first triggering event; and exchange a fifth communication with one or more other vehicles, wherein the fifth communication includes the fifth interaction mode of the first vehicle.

3. The device of claim 1, wherein the computer-executable instructions to identify the first triggering event comprise computer-executable instructions to determine a manual input or a voice input by a user.

4. The device of claim 1, wherein the first communication is sent at a first frequency, the first frequency based on the first interaction mode of the first vehicle.

5. The device of claim 1, wherein the computer-executable instructions to exchange the first communication comprise computer-executable instructions to relay, using an infrastructural component, the first communication to the second vehicle and the third vehicle.

6. The device of claim 1, wherein the first communication and second communication involve using a vehicle-to-everything (V2X) or a cellular V2X (C-V2X) protocol.

7. The device of claim 1, wherein the computer-executable instructions further comprise computer-executable instructions to:
determine that a distance between the second vehicle and first vehicle is smaller than a distance between the third vehicle and the first vehicle, wherein sending, by the first vehicle, the indication for the second vehicle to change to a fourth interaction mode based on the determination that the distance between the second vehicle and first vehicle is smaller than the distance between the third vehicle and the first vehicle.

8. A system, comprising:
at least one memory device that stores computer-executable instructions; and
at least one processor configured to access the at least one memory device, wherein the at least one processor is configured to execute the computer-executable instructions to:
identify a first triggering event associated with a first vehicle;
determine a first interaction mode for the first vehicle based on the first triggering event;
send, from the first vehicle, a first communication to a second vehicle and a third vehicle, the first communication including the first interaction mode of the first vehicle;
receive, from the second vehicle, a second communication indicating that the second vehicle is in a second interaction mode;
receive, from the third vehicle, a third communication indicating that the third vehicle is in the second interaction mode;
filter, by the first vehicle, a fourth communication from a fourth vehicle based on an indication in the fourth communication that the fourth vehicle is in an interaction mode other than the second interaction mode;
determine that an amount of time the second vehicle has been in the second interaction mode is greater than an amount of time the third vehicle has been in the second interaction mode; and
send, by the first vehicle, an indication for the second vehicle to change to the first interaction mode or a fourth interaction mode based on the determination that the amount of time the second vehicle has been in the second interaction mode is greater than the amount of time the third vehicle has been in the second interaction mode.

9. The system of claim 8, wherein the first communication and second communication involve using a vehicle-to-everything (V2X) or a cellular V2X (C-V2X) protocol.

10. The system of claim 8, wherein the computer-executable instructions to identify the first triggering event comprise computer-executable instructions to determine a manual input or a voice input by a user.

11. The system of claim 8, wherein the first communication is sent at a first frequency, the first frequency based on the first interaction mode of the first vehicle.

12. The system of claim 8, wherein the computer-executable instructions to exchange the first communication comprise computer-executable instructions to perform at least one of:
relaying, using an infrastructural component, the first communication to the second vehicle and the third vehicle.

13. A method, comprising:
sending, from a first vehicle occupying a parking space, a first communication to a second vehicle and a third vehicle, the first communication including an indication that the first vehicle is vacating the parking space;
receiving, from the second vehicle, a second communication indicating that the second vehicle is searching for a parking space;
receiving, from the third vehicle, a third communication indicating that the third vehicle is also searching for a parking space;
filtering, by the first vehicle, a fourth communication from a fourth vehicle based on an indication in the fourth communication that the fourth vehicle is not searching for a parking space;
determining that an amount of time the second vehicle has been searching for a parking space is greater than an amount of time the third vehicle has been searching for a parking space; and
sending, by the first vehicle, an indication for the second vehicle to occupy the parking space instead of the third vehicle based on the determination that the amount of time the second vehicle has been searching for a parking space is greater than an amount of time the third vehicle has been searching for a parking space.

14. The method of claim 13, further comprising determining a manual input or a voice input by a user.

15. The method of claim 13, wherein exchanging the first communication further comprises:
relaying, using an infrastructural component, the first communication to the second vehicle and the third vehicle.

* * * * *